(12) United States Patent
Sawa et al.

(10) Patent No.: US 9,048,502 B2
(45) Date of Patent: Jun. 2, 2015

(54) LITHIUM SECONDARY BATTERY AND METHOD FOR PRODUCING THE SAME

(75) Inventors: Shouichiro Sawa, Kobe (JP); Atsushi Fukui, Kobe (JP); Yasunori Watanabe, Kobe (JP); Taizou Sunano, Kobe (JP)

(73) Assignee: SANYO Electric Co., Ltd., Daito-shi (JP)

( * ) Notice: Subject to any disclaimer, the term of this patent is extended or adjusted under 35 U.S.C. 154(b) by 216 days.

(21) Appl. No.: 13/993,892

(22) PCT Filed: Dec. 7, 2011

(86) PCT No.: PCT/JP2011/078289
§ 371 (c)(1),
(2), (4) Date: Jun. 13, 2013

(87) PCT Pub. No.: WO2012/081465
PCT Pub. Date: Jun. 21, 2012

(65) Prior Publication Data
US 2013/0266834 A1 Oct. 10, 2013

(30) Foreign Application Priority Data

Dec. 13, 2010 (JP) ................. 2010-277299

(51) Int. Cl.
| | |
|---|---|
| *H01M 10/04* | (2006.01) |
| *H01M 4/134* | (2010.01) |
| *H01M 10/052* | (2010.01) |
| *H01M 10/0587* | (2010.01) |
| *H01M 4/02* | (2006.01) |
| *H01M 4/62* | (2006.01) |

(52) U.S. Cl.
CPC .... *H01M 10/0431* (2013.01); *H01M 2004/021* (2013.01); *H01M 10/0422* (2013.01); *H01M 2004/028* (2013.01); *H01M 4/134* (2013.01); *H01M 4/621* (2013.01); *H01M 10/052* (2013.01); *H01M 10/0587* (2013.01); *H01M 2004/025* (2013.01); *Y02E 60/122* (2013.01); *H01M 2004/027* (2013.01)

(58) Field of Classification Search
None
See application file for complete search history.

(56) References Cited

U.S. PATENT DOCUMENTS

| 2004/0043294 A1 | 3/2004 | Fukui et al. | |
| 2012/0058375 A1* | 3/2012 | Tanaka et al. | 429/94 |

FOREIGN PATENT DOCUMENTS

| JP | 60-243967 A | 12/1985 |
| JP | 4-28175 A | 1/1992 |

(Continued)

OTHER PUBLICATIONS

International Search Report dated Feb. 21, 2012, issued in corresponding application No. PCT/JP2011/078289.

*Primary Examiner* — Ula C Ruddock
*Assistant Examiner* — Matthew Van Oudenaren
(74) *Attorney, Agent, or Firm* — Westerman, Hattori, Daniels & Adrian, LLP (57) ABSTRACT

A lithium secondary battery and a method for producing the lithium secondary battery. The lithium secondary battery includes a negative electrode 1 in which negative electrode mixture layers 2 and 3 that contain active material particles containing silicon and/or a silicon alloy and a binder are disposed on the surfaces of a current collector 4. A electrode body is formed by spirally winding, from inside to outside, a laminate body; and in an outer end portion of the negative electrode 1, the negative electrode mixture layers 2 and 3 have tapering portions 2a and 3a whose thicknesses decrease toward ends 2b and 3b of the negative electrode mixture layers 2 and 3; and oozing portions 2d and 3d mainly containing the binder are formed at the tips of the tapering portions 2a and 3a of the negative electrode mixture layers 2 and 3.

4 Claims, 3 Drawing Sheets

(56) References Cited

FOREIGN PATENT DOCUMENTS

| JP | 11-250937 A | 9/1999 |
| JP | 2002-260637 A | 9/2002 |
| JP | 2005-174790 A | 6/2005 |
| JP | 2008-21517 A | 1/2008 |
| JP | 2008-34353 A | 2/2008 |
| JP | 2009-224239 A | 10/2009 |

* cited by examiner

LITHIUM SECONDARY BATTERY AND METHOD FOR PRODUCING THE SAME

TECHNICAL FIELD

The present invention relates to a wound-type lithium secondary battery in which a negative electrode employing active material particles containing silicon and/or a silicon alloy as a negative electrode active material, a positive electrode, and a separator are spirally wound; and a method for producing the lithium secondary battery.

BACKGROUND ART

In recent years, a lithium secondary battery that employs a non-aqueous electrolyte and is charged and discharged through transfer of lithium ions between the positive electrode and the negative electrode has been used as one of new secondary batteries having a high power and a high energy density.

Such a lithium secondary battery that employs a material that alloys with lithium as a negative electrode active material is known. However, such an active material that alloys with lithium undergoes volume expansion and contraction during occlusion and release of lithium. Accordingly, the active material turns into fine powder or the active material becomes separated from a current collector during charging and discharging. Thus, the current-collection capability is degraded and the charge-discharge cycle characteristic becomes poor, which is problematic.

Patent Literature 1 states that, in a lithium secondary battery employing silicon and/or a silicon alloy as an active material, a mixture layer containing the active material and a binder is disposed through sintering in a non-oxidizing atmosphere so that the active material mixture layer is tightly bonded to the current collector and a good charge-discharge cycle characteristic is achieved.

However, when such a lithium secondary battery is configured as a wound-type battery in which a laminate body having a stack of a negative electrode, a separator, and a positive electrode is spirally wound, the whole electrode expands and contracts during charging and discharging and the electrode cannot withstand the expansion and breaks, which is problematic.

In the present invention, as described below, a tapering portion is formed in an outer end portion of the negative electrode. Existing techniques of forming a tapering portion in an end portion of an electrode are described in the following Patent Literatures 2 to 4.

Patent Literature 2 discloses that the inner end portion of a positive or negative electrode is formed as a tapering shape so that separation of a porous layer composed of a filler and a binder and disposed on the positive or negative electrode is suppressed.

In Patent Literature 3, the inner end portions of electrodes are formed as tapering shapes so that the central portion of the electrode body is formed as a smooth circular shape to thereby suppress damage to the separator.

In Patent Literature 4, the whole circumference of a positive electrode plate is subjected to chamfering so that the positive electrode plate is pressed by the separator and gaps are not generated.

CITATION LIST

Patent Literature

PTL 1: Japanese Published Unexamined Patent Application No. 2002-260637

PTL 2: Japanese Published Unexamined Patent Application No. 2005-174790

PTL 3: Japanese Published Unexamined Patent Application No. 60-243967

PTL 4: Japanese Published Unexamined Patent Application No. 4-28175

SUMMARY OF INVENTION

Technical Problem

An object of the present invention is to provide a lithium secondary battery in which breakage of an electrode due to expansion and contraction of an active material during charging and discharging can be suppressed; and a method for producing the lithium secondary battery.

Solution to Problem

A lithium secondary battery according to the present invention includes a negative electrode in which a negative electrode mixture layer that contains active material particles containing silicon and/or a silicon alloy and a binder is disposed on a surface of a current collector; a positive electrode; a separator disposed between the negative electrode and the positive electrode; a non-aqueous electrolyte; and a casing that houses the negative electrode, the positive electrode, the separator, and the non-aqueous electrolyte, wherein an electrode body formed by spirally winding, from inside to outside, a laminate body in which the negative electrode, the separator, and the positive electrode are stacked is housed in the casing; in an outer end portion of the negative electrode, the negative electrode mixture layer has a tapering portion whose thickness decreases toward an end of the negative electrode mixture layer; and an oozing portion mainly containing the binder is formed at a tip of the tapering portion of the negative electrode mixture layer.

Here, "mainly containing the binder" means that the content of the binder is 70% by mass or more.

According to the present invention, by forming, in an outer end portion of the negative electrode, the negative electrode mixture layer so as to have a tapering portion whose thickness decreases toward an end of the negative electrode mixture layer, breakage of the electrode due to expansion and contraction of the active material during charging and discharging can be suppressed. In addition, in the present invention, since an oozing portion is formed at the tip of the tapering portion of the negative electrode mixture layer, the adhesion between the negative electrode mixture layer and the current collector can be enhanced and separation of the negative electrode mixture layer can be suppressed.

In the present invention, when a negative electrode tab is disposed on the current collector in a region not containing the negative electrode mixture layer in the outer end portion of the negative electrode, the negative electrode tab is preferably positioned in a region formed by extensions of lines that connect a center of the electrode body and the tapering portion. As a result, breakage of the electrode can be further suppressed.

In the present invention, the negative electrode current collector is preferably formed of copper or a copper alloy and the surface of the current collector is preferably roughened.

In the present invention, the binder may be, for example, polyimide.

A production method according to the present invention is a method allowing production of the above-described lithium secondary battery according to the present invention, the method including: a step of preparing a negative electrode mixture slurry containing the active material particles, the binder, and a solvent; a step of producing the negative electrode by applying the negative electrode mixture slurry onto the surface of the current collector to form the negative electrode mixture layer; a step of forming the electrode body by winding the laminate body in which the negative electrode, the separator, and the positive electrode are stacked; and a step of producing the lithium secondary battery by housing the electrode body and the non-aqueous electrolyte in the casing.

A production method according to the present invention allows production of a lithium secondary battery in which breakage of an electrode due to expansion and contraction of an active material during charging and discharging can be suppressed.

In a production method according to the present invention, the negative electrode mixture slurry is applied onto the current collector by, for example, a gravure process.

In a production method according to the present invention, the negative electrode mixture slurry preferably has a viscosity of 100 mPa·s or less. When the negative electrode mixture slurry has a viscosity of 100 mPa·s or less, the oozing portion can be easily formed at the tip of the tapering portion of the negative electrode mixture layer and the strength of adhesion of the negative electrode mixture layer to the current collector can be enhanced.

Advantageous Effects of Invention

According to the present invention, breakage of an electrode due to expansion and contraction of an active material during charging and discharging can be suppressed.

DESCRIPTION OF EMBODIMENTS

Hereinafter, the present invention will be described with reference to specific embodiments. However, the present invention is not limited to the embodiments below.

Figure 1:
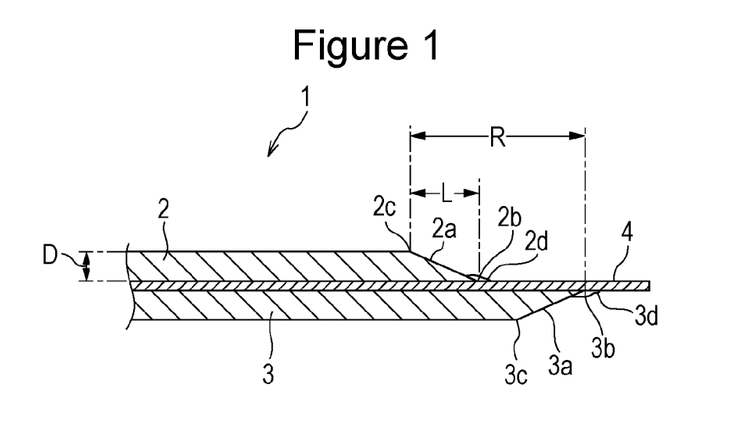
FIG. 1 is a sectional view of an outer end portion of a negative electrode according to an embodiment of the present invention.

FIG. 1 is a sectional view of an outer end portion of a negative electrode according to an embodiment of the present invention.

As illustrated in FIG. 1, in a negative electrode 1, negative electrode mixture layers 2 and 3 are disposed on both surfaces of a negative electrode current collector 4. The negative electrode mixture layer 2 is formed so as to have a tapering portion 2a whose thickness decreases toward an end of the negative electrode mixture layer 2. In the tapering portion 2a, the thickness of the tapering portion 2a gradually decreases from an inner end portion 2c of the tapering portion 2a; in an outer end portion 2b, which is the tip of the tapering portion 2a, the negative electrode mixture layer 2 is no longer present and the negative electrode current collector 4 is exposed. In the outer end portion 2b, which is the tip of the tapering portion 2a, an oozing portion 2d is formed. The oozing portion 2d does not contain active material particles but contains a binder.

The negative electrode mixture layer 3 is also formed so as to have a tapering portion 3a whose thickness decreases toward an end of the negative electrode mixture layer 3. In the tapering portion 3a, the thickness of the tapering portion 3a gradually decreases from an inner end portion 3c of the tapering portion 3a; in an outer end portion 3b, which is the tip of the tapering portion 3a, the negative electrode mixture layer 3 is no longer present and the surface of the negative electrode current collector 4 is exposed. In the outer end portion 3b, which is the tip of the tapering portion 3a, an oozing portion 3d is also formed.

The thickness D of the negative electrode mixture layer 2 is not particularly limited. In general, the thickness D is preferably in the range of 10 to 30 μm, more preferably in the range of 16 to 24 μm. The length L of the tapering portion 2a is not particularly limited. In general, the length L is preferably in the range of 10 to 30 mm, more preferably in the range of 16 to 24 mm.

When the length of the tapering portion is excessively small, the slope of the tapering portion becomes small and the effect provided is reduced. When the length is excessively large, a region with a small coating amount becomes large. When such a region with a small coating amount is disposed so as to face the positive electrode, variations in the negative electrode utilization occur. Accordingly, the region cannot be disposed so as to face the positive electrode and the positive electrode region contributing to charging and discharging becomes small.

It is not particularly a limitation, but a tapering region R described below may extend over the whole circumference of the wound body. When the tapering region R is present over the whole circumference, the position of the tab can be selected with a high degree of freedom.

The thickness of the negative electrode mixture layer 3 and the length of the tapering portion 3a are also preferably in the above-described ranges.

In the present embodiment, the tapering portion 3a of the negative electrode mixture layer 3 is positioned on an outer side with respect to the tapering portion 2a of the negative electrode mixture layer 2. Thus, the tapering portion 2a and the tapering portion 3a are displaced from each other. The region between the outer end portion 3b of the tapering portion 3a and the inner end portion 2c of the tapering portion 2a is the tapering region R. The length of the tapering region R is not particularly limited. This length is preferably in the range of 20 to 60 mm, more preferably in the range of 32 to 48 mm.

Figure 2:
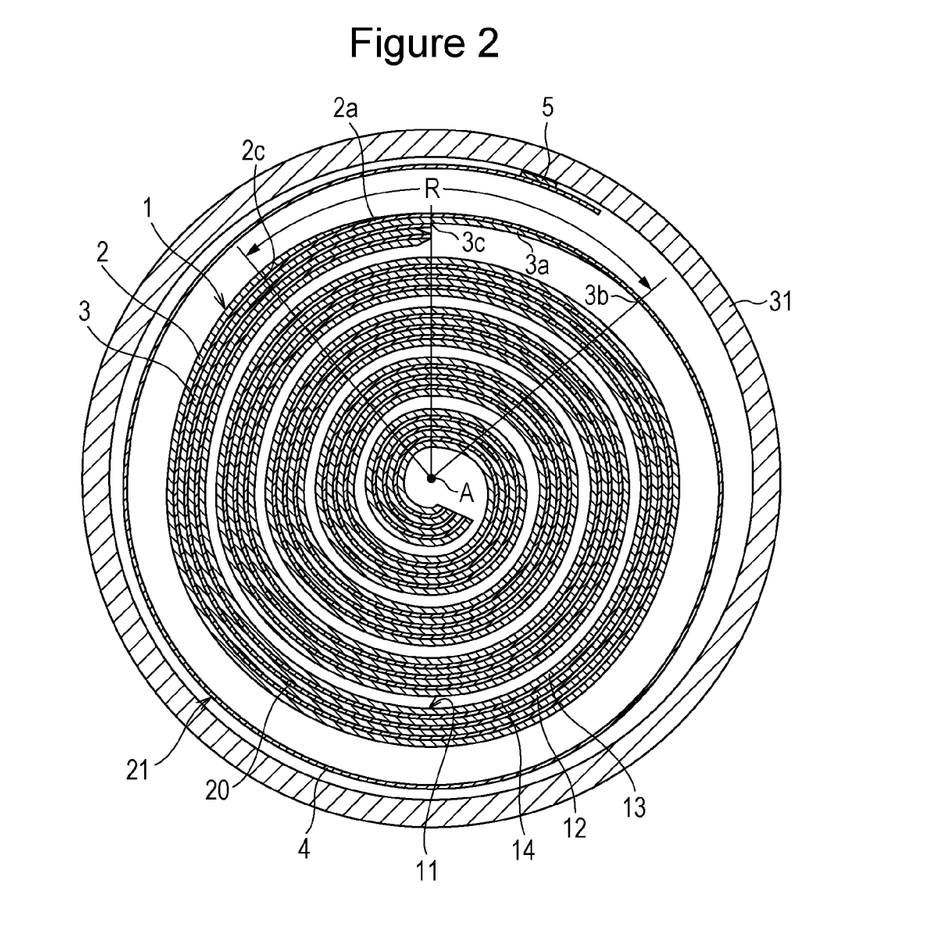
FIG. 2 is a sectional view of an electrode body according to the present invention formed by winding a laminate body in which a negative electrode, a separator, and a positive electrode are stacked, the electrode body being placed within a casing.

FIG. 2 is a schematic sectional view of an electrode body formed by spirally winding, from inside to outside, a laminate body in which the negative electrode having a negative electrode tip portion illustrated in FIG. 1, a separator, and a positive electrode are stacked, the electrode body being placed within a casing.

The negative electrode 1 has a configuration in which the negative electrode mixture layers 2 and 3 are disposed on both surfaces of the negative electrode current collector 4. As has been described with reference to FIG. 1, the tapering portion 2a of the negative electrode mixture layer 2 and the tapering portion 3a of the negative electrode mixture layer 3 are formed in an outer end portion of the negative electrode 1. In a region that is on an outer side with respect to the tapering portion 3a, the negative electrode current collector 4 is exposed and a portion constituted by the negative electrode current collector 4 alone is provided over substantially an entire circumferential length. A negative electrode tab 5 is attached to a tip portion of the negative electrode current collector 4.

In a region that is on an inner side with respect to the tapering portion 2a, the negative electrode 1 is disposed on a positive electrode 11 with a separator 20 therebetween. This laminate body is spirally wound to constitute an electrode body 21. The positive electrode 11 has a configuration in which positive electrode mixture layers 12 and 13 are disposed on both surfaces of a positive electrode current collector 14.

The electrode body 21 is inserted into a casing 31 constituted by a casing can having a cylindrical shape.

The tapering region R is a region between an extension of a line connecting the center A of the electrode body 21 and the outer end portion 3b of the tapering portion 3a and an extension of a line connecting the center A of the electrode body 21 and the inner end portion 2c of the tapering portion 2a. In the present embodiment, the negative electrode tab 5 is positioned in the tapering region R. When the negative electrode tab 5 is positioned in the tapering region R, the stress due to the presence of the negative electrode tab 5 can be reduced in the tapering region R and hence breakage of the electrode due to expansion and contraction of the active material during charging and discharging can be further suppressed.

As illustrated in FIG. 2, a portion of the negative electrode mixture layer 2 in the outermost circumference does not face the positive electrode mixture layers 12 and 13. As described above, in the present embodiment, the tapering portion 3a is positioned on an outer side with respect to the tapering portion 2a. When the tapering portion 3a is positioned on an outer side with respect to the tapering portion 2a, the portion of the negative electrode mixture layer 3 facing the positive electrode mixture layer 14 and contributing to charging and discharging can extend further on the outer side, thereby increasing the charge capacity.

When the tapering portion 2a and the tapering portion 3a are displaced from each other, the slope formed over the entire tapering region R can become gentler.

A tapering portion of a negative electrode according to the present invention can be formed by, for example, applying a negative electrode mixture slurry onto a current collector by a gravure process.

Figure 7:
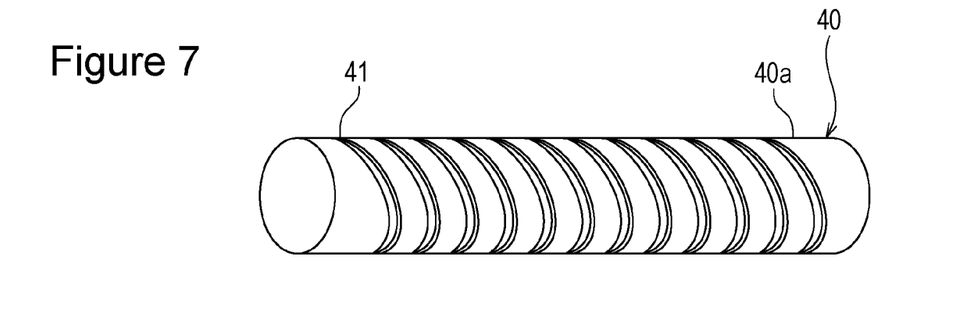
FIG. 7 is a perspective view of an example of a gravure roll.

FIG. 7 is a perspective view of an example of a gravure roll. In a gravure roll 40 illustrated in FIG. 7, a spiral groove 41 is formed in a surface 40a of the gravure roll 40. During application of a negative electrode mixture slurry, the negative electrode mixture slurry is held in the groove 41 and the negative electrode mixture slurry held in the groove 41 is transferred onto the negative electrode current collector so that the negative electrode mixture slurry is applied onto the negative electrode current collector to form the negative electrode mixture layer. By adjusting, for example, the depth or width of the groove 41, the volume for accommodation of the negative electrode mixture slurry can be controlled and the volume of the negative electrode mixture slurry applied can be controlled.

Figure 8:
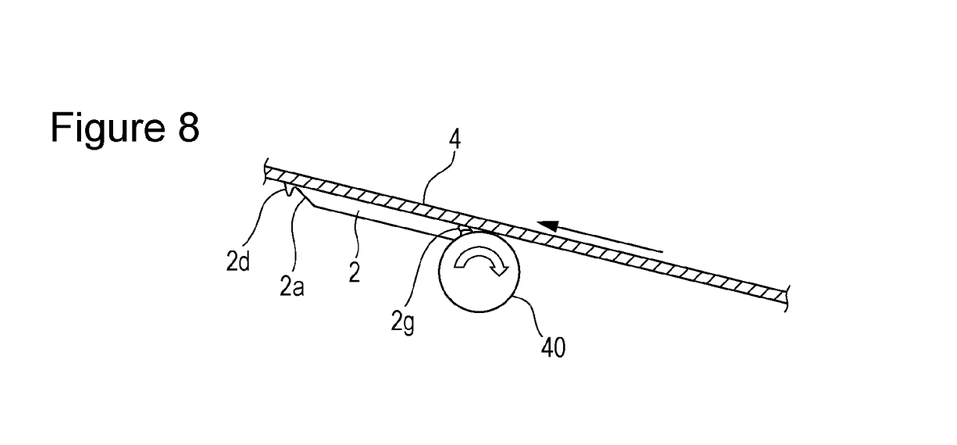
FIG. 8 is a schematic sectional view illustrating application of a negative electrode mixture slurry onto a current collector with a gravure roll.

FIG. 8 is a sectional view illustrating formation of a negative electrode mixture layer with a gravure roll. The lower portion of the gravure roll 40 is immersed in a negative electrode mixture slurry that is not illustrated. The negative electrode mixture slurry is held in the above-described groove 41 so that the negative electrode mixture slurry can be applied onto the negative electrode current collector 4. FIG. 8 illustrates the initiation of application with the gravure roll 40. As illustrated in FIG. 8, a liquid pool 2g is formed at the contact portion between the gravure roll 40 and the negative electrode current collector 4. Before the liquid pool amount of the liquid pool 2g between the gravure roll 40 and the negative electrode current collector 4 becomes constant, the tapering portion 2a is formed. After the liquid pool amount of the liquid pool 2g becomes constant, the thickness becomes substantially uniform. After the gravure roll 40 is removed from the negative electrode current collector 4, the negative electrode mixture slurry is no longer applied onto the negative electrode current collector 4. At the tip of the tapering portion 2a, the oozing portion 2d is formed. The oozing portion 2d is formed by a mechanism described below.

A negative electrode active material used in the present invention is active material particles containing silicon and/or a silicon alloy. Examples of the silicon alloy include a solid solution, an intermetallic compound, and a eutectic alloy between silicon and one or more other elements. The average particle size of the active material particles containing silicon and/or a silicon alloy is not particularly limited; however, the average particle size is preferably 1 to 10 μm.

The binder used in the negative electrode is not particularly limited; however, the binder is preferably polyimide or a fluorocarbon resin such as poly(vinylidene fluoride) or polytetrafluoroethylene. In particular, polyimide is preferably used.

A positive electrode active material used in the present invention is not particularly limited. Positive electrode active materials that are usable for lithium secondary batteries can be used. For example, lithium transition metal composite oxides can be used.

A binder used for the positive electrode can be selected from binders that are usable for positive electrodes of lithium secondary batteries. Examples of the binder include fluorocarbon resins such as poly(vinylidene fluoride), polyimide, and polyacrylonitrile.

A non-aqueous electrolyte used in the present invention is not particularly limited and can be selected from non-aqueous electrolytes that are usable for lithium secondary batteries.

A separator used in the present invention is not particularly limited and can be selected from separators that are usable for lithium secondary batteries. For example, a porous polyethylene-based resin or a porous polypropylene-based resin can be used.

A casing used in the present invention is not particularly limited. In general, a casing that can house a wound-type electrode body formed by spiral winding is used.

In the present invention, the negative electrode mixture layer is formed so as to have a tapering portion whose thickness decreases, in an outer end portion of the negative electrode. Accordingly, the size of the stepped structure of an end of the negative electrode mixture layer can be reduced. Thus, breakage of a current collector or the like due to the stepped structure can be suppressed.

EXAMPLES

Hereinafter, the present invention will be described with reference to specific examples. However, the present invention is not limited to the examples described below.

Experiment 1

Example 1

Production of Negative Electrode

In NMP (N-methyl-2-pyrrolidone) serving as a dispersion medium, silicon particles (average particle size: 10 μm), a graphite powder (average particle size: 3.5 μm) serving as a negative electrode conducting agent, and a precursor of a polyimide resin serving as a negative electrode binder were mixed such that the mixing ratio of negative electrode active material:graphite powder:polyimide resin precursor was 96:4:6.5. Thus, a negative electrode mixture slurry was prepared. The precursor of a polyimide resin had a molecular weight of about 30000.

Both surfaces of a copper alloy foil having a thickness of 12 μm were subjected to copper electroplating such that a surface roughness Ra (refer to JIS B 0601-1994) became 0.239 μm and a surface roughness Rz (refer to JIS B 0601-1994) became 1.61 μm. Thus, a negative electrode current collector having roughened surfaces was prepared. Both surfaces of the negative electrode current collector were coated with the negative electrode mixture slurry by a gravure process at 25° C. in the air.

This member was dried at 120° C. in the air and then rolled at 25° C. in the air.

Subsequently, the member was cut so as to have a strip shape having a length of 1000 mm and a width of 58.6 mm, and then subjected to a heat treatment in an argon atmosphere at 400° C. for 10 hours. Thus, a negative electrode was produced.

On each surface, the thickness D of the negative electrode active material layer was 19 μm and the length L of the tapering portion was 20 mm. The length of the tapering region R was 15 mm.

A nickel plate serving as a negative electrode tab was bonded to a tip portion of the negative electrode in which the negative electrode current collector was exposed.

Figure 3:
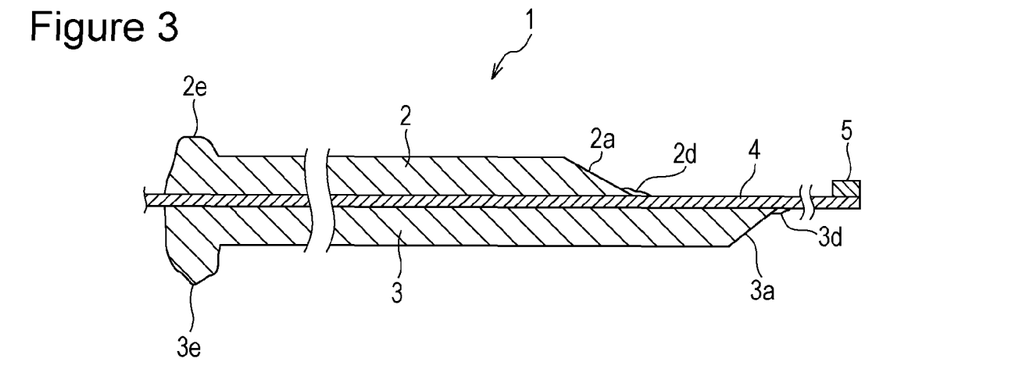
FIG. 3 is a sectional view of a negative electrode in an example of the present invention.

FIG. 3 is a sectional view of the negative electrode obtained in the above-described manner. As illustrated in FIG. 3, the negative electrode mixture layers 2 and 3 are formed so as to have the tapering portions 2a and 3a in an outer end portion of the negative electrode 1. The oozing portion 2d is formed at the tip of the tapering portion 2a. The oozing portion 3d is formed at the tip of the tapering portion 3a. The formation mechanism and effects of these oozing portions 2d and 3d will be described below.

As illustrated in FIG. 3, raised protrusions 2e and 3e are respectively formed at inner ends of the negative electrode mixture layers 2 and 3. These protrusions 2e and 3e are formed during coating by a gravure process at the time when the gravure roll is removed from the negative electrode current collector.

[Production of Positive Electrode]

$LiCoO_2$ used as a positive electrode active material, NMP serving as a dispersion medium, a graphite powder having an average particle size of 3.0 μm and serving as a positive electrode conducting agent, and poly(vinylidene fluoride) serving as a positive electrode binder were mixed such that the mass ratio of the active material, the conducting agent, and the binder was 95:2.5:2.5. Thus, a positive electrode mixture slurry was prepared. This positive electrode mixture slurry was applied onto an aluminum foil serving as a current collector to thereby produce a positive electrode. The aluminum foil had a thickness of 15 μm. The positive electrode mixture layers were formed so as to have a thickness of 67 μm on each surface.

[Preparation of Non-Aqueous Electrolyte]

Ethylene carbonate (EC) and diethyl carbonate (DEC) were mixed in a volume ratio of 3:7. To the resultant mixture, fluoroethylene carbonate (FEC) was added so as to have a content of 10% by mass, $LiPF_6$ was then dissolved at a concentration of 1 mol/l, and carbon dioxide gas was further dissolved to achieve saturation. Thus, a non-aqueous electrolyte was prepared.

[Production of Electrode Body]

A laminate body was produced by placing a separator constituted by a polyethylene fine-pore membrane having a thickness of 14 μm, a length of 1100 mm, and a width of 60.6 mm between the negative electrode and the positive electrode that were produced in the above-described manner. Specifically, the laminate body was produced with two separators for a single positive electrode and a single negative electrode such that the negative electrode, the separator, the positive electrode, and the separator are stacked. This laminate body was spirally wound such that the negative electrode was positioned outside to produce an electrode body. The laminate body was spirally wound around a core having a diameter of 4 mm.

FIG. 2 illustrates a single separator 20 between the negative electrode 1 and the positive electrode 11. However, as described above, another separator 20 was provided on the inside of the positive electrode 11.

Figure 5:
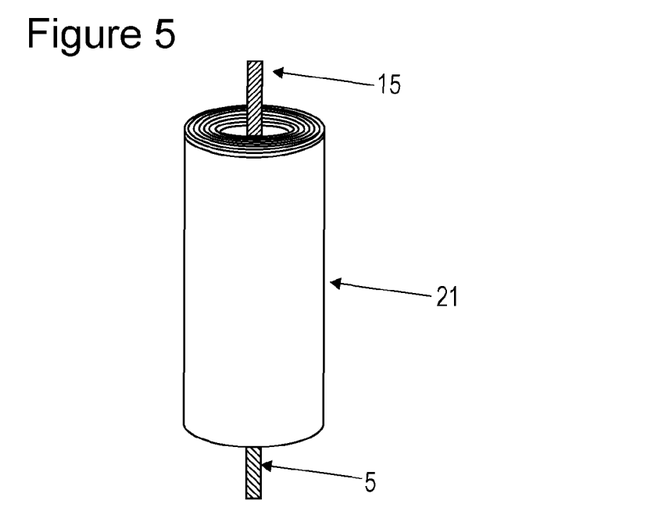
FIG. 5 is a perspective view of an electrode body in an example of the present invention.

FIG. 5 is a perspective view of the electrode body 21. The negative electrode tab 5 extends from one side of the electrode body 21. A positive electrode tab 15 extends from the other side of the electrode body 21.

In the present example, as illustrated in FIG. 2, the electrode body 21 is formed such that the negative electrode tab 5 is positioned in the tapering region R. In addition, the negative electrode tab 5 is positioned in a region between the outer end portion 3b and the inner end portion 3c of the negative electrode mixture layer 3. In the region between the outer end portion 3b and the inner end portion 3c of the negative electrode mixture layer 3, the negative electrode mixture layer 3 does not face the positive electrode mixture layer 14 and hence the region does not contribute to charging and discharging. Accordingly, even when the negative electrode tab 5 is positioned in this region, an increase in the stress due to expansion of the negative electrode mixture layers 2 and 3 during charging, the increase being caused by the presence of the negative electrode tab 5, can be suppressed.

The tapering portion 2a of the negative electrode mixture layer 2 and the tapering portion 3a of the negative electrode mixture layer 3 both do not contribute to charging or discharging. Accordingly, stress during expansion of the negative electrode mixture layers 2 and 3 can be reduced by the portions in the tapering region R.

Figure 6:
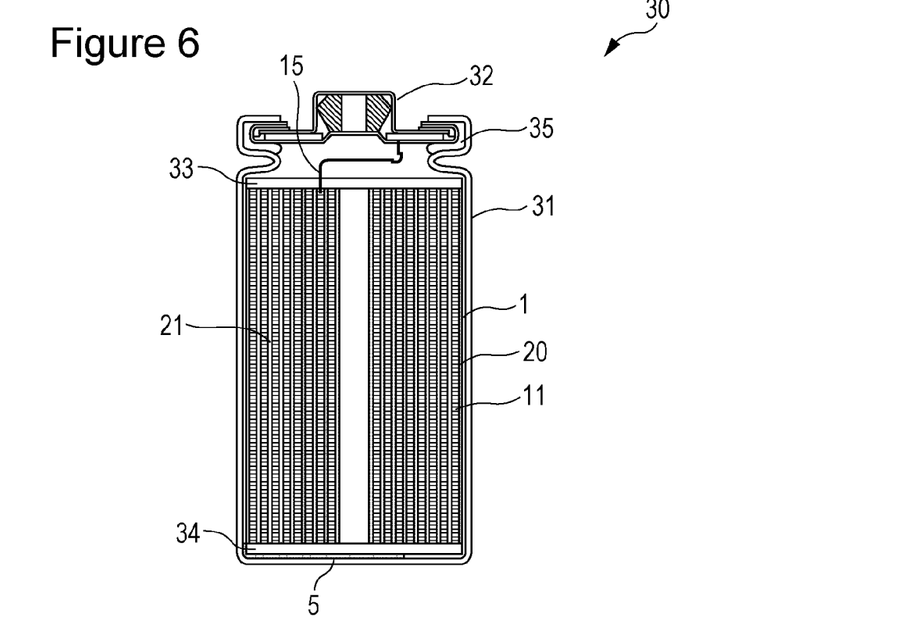
FIG. 6 is a sectional view of a lithium secondary battery in an example of the present invention.

FIG. 6 is a sectional view of a lithium secondary battery produced by inserting the electrode body 21 in FIG. 5 into the casing 31 and then injecting the non-aqueous electrolyte. The casing 31 was an SUS cylindrical casing. The lithium secondary battery was produced in a carbon dioxide atmosphere at 25° C. and 1 atm. The lithium secondary battery obtained was a cylindrical battery having a diameter of 18 mm and a height of 65 mm.

As illustrated in FIG. 6, a lithium secondary battery 30 includes the cylindrical casing 31 having an upper opening; the electrode body 21 that is formed by spirally winding a laminate body having the positive electrode 11, the negative electrode 1, and the separators 20; the non-aqueous electrolyte impregnated into the electrode body 21; and a sealing lid 32 that seals the opening of the casing 31.

The sealing lid 32 serves as a positive electrode terminal. The casing 31 serves as a negative electrode terminal. The positive electrode tab 15 attached to an upper surface portion of the electrode body 21 is connected to the sealing lid 32. The negative electrode tab 5 attached to a lower surface portion of the electrode body 21 is electrically connected to the casing 31. The upper surface and the lower surface of the electrode body 21 are covered with an upper insulating plate 33 and a lower insulating plate 34. The sealing lid 32 is fixed at the opening of the casing 31 by squeezing the casing 31 with an insulating gasket 35 therebetween.

In the above-described manner, the structure allowing charging and discharging is provided. Thus, a battery A1 was produced. The number of the battery A1 produced was three.

Comparative Example 1

Figure 4:
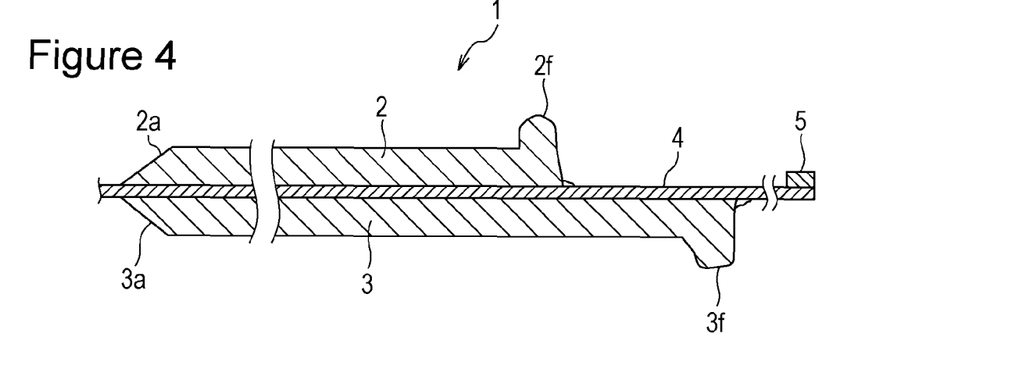
FIG. 4 is a sectional view of a negative electrode in a comparative example.

In this Comparative example, the mixture layers were formed by the gravure process as in Example 1 except that the application was started at inner end portions of the negative electrode and the application was ended at outer end portions of the negative electrode. Accordingly, as illustrated in FIG. 4, tapering portions 2a and 3a are respectively formed at the inner ends of the negative electrode mixture layers 2 and 3; protrusions 2f and 3f are respectively formed at the outer ends of the negative electrode mixture layers 2 and 3.

The protrusions 2f and 3f have a height of 39 μm. The tapering portions 2a and 3a have the same shape as in Example 1. Note that the tapering portions 2a and 3a are formed substantially at the same position.

A lithium secondary battery was produced as in Example 1 except that the above-described negative electrode was used. This battery was defined as a battery B1.

In Comparative example 1, two batteries were produced.

Comparative Example 2

A negative electrode was produced as in Comparative example 1 except that the negative electrode active material was graphite particles having an average particle size of 20 μm instead of silicon particles. A lithium secondary battery was produced with this negative electrode as in Comparative example 1. This battery was defined as a battery B2.

In Comparative example 2, two batteries were produced.

[Evaluation of Batteries]

The obtained batteries A1, B1, and B2 were charged and discharged under the following charge-discharge cycle conditions and evaluated in terms of breakage of electrodes due to charging and discharging.

Charging Condition in the 1st Cycle

A battery was subjected to a constant-current charging at a current of 700 mA for 4 hours, then stored at room temperature for 3 days, subsequently subjected to a constant-current charging at a current of 700 mA until the voltage of the battery reached 4.2 V, and further subjected to a constant-voltage charging at a voltage of 4.2 V until the current reached 170 mA.

Discharging Condition in the 1st Cycle

The battery was subjected to a constant-current discharging at a current of 1000 mA until the voltage of the battery reached 2.75 V.

After the above-described charging and discharging of the 1st cycle were performed, electrodes were taken out and observed as to whether breakage occurred or not in the electrodes. Regarding the battery A1, three batteries were produced and hence these three batteries were evaluated. Regarding each of the batteries B1 and B2, two batteries were produced and hence these two batteries were evaluated. The ratios of breakage during the charging and discharging are described in Table 1.

TABLE 1

| Battery | Negative electrode active material | Shape of outer ends of negative electrode mixture layers | Ratio of breakage during charging and discharging |
|---|---|---|---|
| A1 (Example 1) | Si | taper | 0/3 |
| B1 (Comparative example 1) | Si | protrusion | 2/2 |
| B2 (Comparative example 2) | C | protrusion | 0/2 |

As is clear from comparison between the battery A1 and the battery B1 in Table 1, by forming tapering portions at outer ends of negative electrode mixture layers according to the present invention, breakage of the negative electrode during charging and discharging can be suppressed.

In addition, as is clear from comparison between the battery B1 and the battery B2, the breakage of the negative electrode during charging and discharging particularly occurs in the case of using, as the negative electrode active material, an active material that undergoes considerable volume expansion and contraction due to charging and discharging, such as silicon.

Experiment 2

Here, an oozing portion formed at the tip of a negative electrode mixture layer was examined.

Example 2

A negative electrode mixture layer was formed as in Example 1 by using the same current collector and negative electrode mixture slurry as in Example 1. Note that the negative electrode mixture slurry had a viscosity of 40 mPa·s.

An oozing portion was observed at the tip of the outer end of the negative electrode mixture layer. The oozing portion is observed as a transparent coating film that does not contain the negative electrode active material, the conducting agent, or the like, but contains the binder. Visual inspection or the like can be employed to determine as to whether the oozing portion is present or not. When a transparent resin portion is present at the tip of the outer end of a negative electrode mixture layer, this transparent resin portion is the oozing portion. The oozing portion can be defined as a transparent resin portion that has a length of 2.0 mm or more in the longitudinal direction of the current collector.

Comparative Example 3

A negative electrode mixture layer was formed as in Example 2 except that the copper alloy foil used in Example 1 and not roughened by copper electroplating was used as the current collector.

In this Comparative example, the oozing portion was not observed.

Comparative Example 4

The same current collector as in Example 2 was used and a negative electrode was produced as in Example 2 except that a negative electrode mixture slurry having a slurry viscosity of 200 mPa·s was used. Note that the viscosity of the slurry was adjusted by replacing 50% by mass of the precursor of a polyimide resin in Example 1 with a polyimide-resin precursor having a molecular weight of 100000 or more.

In this Comparative example, the oozing portion was not observed.

[Evaluation of Adhesion]

A double-faced tape having a width of 2 cm and a length of 10 cm was attached to a negative electrode. The load required to peel off the negative electrode mixture layer was measured and defined as adhesion. The measurement results are described in Table 2.

In addition, in the peeling off in the negative electrode, observation as to whether the negative electrode mixture layer was separated from the current collector or not was performed. A case in which the negative electrode mixture layer was separated from the negative electrode current collector was evaluated as "Occurred". A case in which the negative electrode mixture layer was not separated from the negative electrode current collector and the negative electrode mixture layer itself was broken up was evaluated as "None".

The results in terms of adhesion and separation of the negative electrode mixture layer are described in Table 2.

of copper or a copper alloy and the surface of the current collector is preferably roughened.

REFERENCE SIGNS LIST 1 negative electrode
2, 3 negative electrode mixture layer
2a, 3a tapering portion
2d, 3d oozing portion
4 negative electrode current collector
5 negative electrode tab
11 positive electrode
12, 13 positive electrode mixture layer
14 positive electrode current collector
15 positive electrode tab
20 separator
21 electrode body
30 lithium secondary battery
31 casing
32 sealing lid
33 upper insulating plate
34 lower insulating plate
35 insulating gasket
R tapering region

TABLE 2

| | Roughening of surface | Ra | Rz | Slurry viscosity (mPa · s) | Oozing portion of negative electrode | Shape of outer end of negative electrode mixture layer | Adhesion (N) | Separation of negative electrode mixture layer |
|---|---|---|---|---|---|---|---|---|
| Example 2 | Performed | 0.239 | 1.61 | 40 | Present | Taper | 1.1 | None |
| Comparative example 3 | Not performed | 0.039 | 0.584 | 40 | Absent | Taper | 0.8 | Occurred |
| Comparative example 4 | Performed | 0.239 | 1.61 | 200 | Absent | Taper | 0.7 | Occurred |

Comparison between Example 2 and Comparative example 3 indicates that the oozing portion is formed when a surface of the negative electrode current collector is roughened. When the surface is roughened, the negative electrode mixture slurry applied passes through valley portions in the roughened surface region and the binder component oozes out by capillarity to the outside of the negative electrode mixture layer. As a result, an oozing portion in the present invention is probably formed. Thus, the oozing portion and the negative electrode mixture layer are continuously formed.

The results in Table 2 indicate that use of a negative electrode current collector having an Ra of 0.1 or more and an Rz of 1.0 or more probably facilitates the formation of the oozing portion.

Comparison between Example 2 and Comparative example 4 indicates that low slurry viscosity facilitates the formation of the oozing portion. The results in Table 2 indicate that a slurry viscosity of 100 mPa·S or less probably facilitates the formation of the oozing portion.

In addition, the results in Table 2 indicate that the presence of the oozing portion increases the adhesion and suppresses separation of the negative electrode mixture layer.

In summary, it has been demonstrated that, by appropriately adjusting the surface roughness of the negative electrode current collector and the viscosity of the negative electrode mixture slurry, the oozing portion can be formed and a high adhesion between the negative electrode mixture layer and the negative electrode current collector can be achieved.

Accordingly, it is understood that, in the present invention, the negative electrode current collector is preferably formed

The invention claimed is:

1. A lithium secondary battery comprising a negative electrode in which a negative electrode mixture layer that contains active material particles containing silicon and/or a silicon alloy and a binder is disposed on a surface of a current collector; a positive electrode; a separator disposed between the negative electrode and the positive electrode; a non-aqueous electrolyte; and a casing that houses the negative electrode, the positive electrode, the separator, and the non-aqueous electrolyte, wherein an electrode body formed by spirally winding, from inside to outside, a laminate body in which the negative electrode, the separator, and the positive electrode are stacked is housed in the casing, in an outer end portion of the negative electrode, the negative electrode mixture layer has a tapering portion whose thickness decreases toward an end of the negative electrode mixture layer; and an oozing portion mainly containing the binder is formed at a tip of the tapering portion of the negative electrode mixture layer.

2. The lithium secondary battery according to claim 1, wherein a negative electrode tab is disposed on the current collector in a region not containing the negative electrode mixture layer in the outer end portion of the negative electrode; and the negative electrode tab is positioned in a region formed by extensions of lines that connect a center of the electrode body and the tapering portion.

3. The lithium secondary battery according to claim 1, wherein negative electrode mixture layers are formed on both surfaces of the current collector; and the tapering portion of one of the negative electrode mixture layers is positioned on an outer side or an inner side with respect to the tapering portion of the other one of the negative electrode mixture layers such that the tapering portions are displaced from each other.

4. The lithium secondary battery according to claim 2, wherein negative electrode mixture layers are formed on both surfaces of the current collector; and the tapering portion of one of the negative electrode mixture layers is positioned on an outer side or an inner side with respect to the tapering portion of the other one of the negative electrode mixture layers such that the tapering portions are displaced from each other.

* * * * *